(12) United States Patent
Helle et al.

(10) Patent No.: US 7,830,031 B2
(45) Date of Patent: Nov. 9, 2010

(54) PROTECTION SYSTEM FOR AN ELECTRIC GENERATOR, WIND TURBINE AND USE HEREOF

(75) Inventors: Lars Helle, Suldrup (DK); Morten Lindholm, Hojbjerg (DK); Jari Ottesen, Arthus C (DK); John Johannes Mathias Hubertus Nieuwenhuizen, Horsens (DK)

(73) Assignee: Vestas Wind Systems A/S (DK)

( * ) Notice: Subject to any disclaimer, the term of this patent is extended or adjusted under 35 U.S.C. 154(b) by 0 days.

(21) Appl. No.: 12/211,446

(22) Filed: Sep. 16, 2008

(65) Prior Publication Data
US 2009/0008945 A1 Jan. 8, 2009

Related U.S. Application Data

(63) Continuation of application No. PCT/DK2007/000137, filed on Mar. 19, 2007.

(51) Int. Cl.
*F03D 9/00* (2006.01)
*H02P 9/04* (2006.01)
(52) U.S. Cl. .......................................... 290/44; 340/71
(58) Field of Classification Search .................. 290/44, 290/55; 415/4.5, 2.1, 4.2, 4.1; 60/398; 416/7, 416/132 B; 310/71
See application file for complete search history.

(56) References Cited

U.S. PATENT DOCUMENTS

| 86,630 | A | | 2/1869 | Bascom | |
|---|---|---|---|---|---|
| 2,153,523 | A | * | 4/1939 | Edmonds et al. | 290/55 |
| 3,691,542 | A | * | 9/1972 | Gabor | 360/99.08 |
| 4,203,707 | A | * | 5/1980 | Stepp | 416/119 |
| 4,427,897 | A | * | 1/1984 | Migliori | 290/44 |
| 4,801,270 | A | * | 1/1989 | Scarlata | 439/95 |
| 4,831,295 | A | * | 5/1989 | Posedel | 310/72 |
| 5,914,547 | A | | 6/1999 | Barahia et al. | |
| 6,476,513 | B1 | * | 11/2002 | Gueorguiev | 290/55 |
| 6,566,764 | B2 | * | 5/2003 | Rebsdorf et al. | 290/44 |
| 6,714,020 | B2 | * | 3/2004 | Hobelsberger et al. | 324/525 |
| 6,954,004 | B2 | * | 10/2005 | Skeist et al. | 290/44 |
| 7,102,379 | B2 | * | 9/2006 | Hobelsberger et al. | 324/772 |
| 7,117,744 | B2 | * | 10/2006 | Hobelsberger et al. | 73/660 |
| 7,212,010 | B2 | * | 5/2007 | Hobelsberg | 324/545 |
| 7,508,089 | B2 | * | 3/2009 | Guang et al. | 290/44 |
| 2007/0159763 | A1 | * | 7/2007 | Barnard et al. | 361/212 |

FOREIGN PATENT DOCUMENTS

EP 0150884 A2 7/1985

(Continued)

OTHER PUBLICATIONS

International Search Report, Jul. 11, 2007, 3 pages.

(Continued)

*Primary Examiner*—Julio C. Gonzalez
(74) *Attorney, Agent, or Firm*—St. Onge Steward Johnston & Reens LLC

(57) ABSTRACT

The invention relates to a protection system for an electric generator of a wind turbine comprising at least one current path from the non drive end of the generator shaft to a ground potential, and at least one alternating current path from the drive end of the generator shaft to the ground potential. The invention also relates to a wind turbine and use hereof.

15 Claims, 6 Drawing Sheets

FOREIGN PATENT DOCUMENTS

| | | |
|---|---|---|
| EP | 150884 A2 * | 8/1985 |
| EP | 1036937 A2 | 3/2000 |
| EP | 1318589 A1 | 6/2003 |
| EP | 1568883 A2 | 8/2005 |
| EP | 1589630 A2 | 10/2005 |
| GB | 2331858 A | 6/1999 |
| JP | 59149758 A * | 8/1984 |
| WO | WO 03/054389 A1 * | 7/2003 |

OTHER PUBLICATIONS

International Preliminary Report on Patentability, Jul. 25, 2008, 6 pages.

* cited by examiner

PROTECTION SYSTEM FOR AN ELECTRIC GENERATOR, WIND TURBINE AND USE HEREOF

CROSS-REFERENCE TO RELATED APPLICATIONS

The present application is a continuation of pending International patent application PCT/DK2007/000137, filed Mar. 19, 2007, which designates the United States and claims priority from Denmark patent application No. PA 2006 00383, filed Mar. 17, 2006, the content of which is incorporated herein by reference.

FIELD OF THE INVENTION

The present invention relates to a protection system for an electric generator, a wind turbine and a use hereof.

BACKGROUND OF THE INVENTION

Typically, modern wind turbines are connected to an electric utility grid in order to be able to generate and supply electricity to consumers located remotely from the wind turbines.

The rotor speed of the wind turbine increases and decreases with changing wind speed in order to subtract as much energy from the wind as possible, and consequently the electric generator generates electricity with a variable frequency. The electricity is converted by a frequency converter to electricity with a fixed frequency which is supplied to the electric utility grid.

The frequency converter may introduce different stray currents to the electric generator such as in the shaft and housing of the generator. In order to avoid the stray current it is well known to ground the stationary and rotating parts of the generator.

However, the well known ways of grounding the stationary and rotating parts may often create problems in relation to circling stray currents within the generator. Circling stray currents may result in bearing corrosion which negatively affects the service life of the generator.

It is therefore an object of the present invention to provide a solution which is more efficiently adapted to the situation of an electric generator such as in a wind turbine.

SUMMARY OF THE INVENTION

The invention provides a protection system for an electric generator of a wind turbine comprising at least one direct current path from the non drive end of the generator shaft to a ground potential, and at least one alternating current path from the drive end of the generator shaft to the ground potential.

Hereby is obtained a system which may efficiently protect the electric generator by controlling the paths of different stray currents in the wind turbine. Especially it is possible to avoid circling stray currents in the electric generator that may damage the bearings.

The term "alternating current path" should be understood as a defined path only directing alternating currents.

In one aspect of the invention, said alternating current path comprises an impedance circuit such as at least one capacitor.

The term "impedance circuit" should be understood as a separate and defined electric unit which at least is made up of one reactance value.

The capacitor establishes a desired path for the high frequency part of the stray current. Further, the capacitor hinders an undesired path for DC stray current which only is desired to be grounded at the non drive end.

In one aspect of the invention, said at least one capacitor is a type of capacitor with a high rate of voltage change dV/dt capability e.g. at least 500 volt/µsec such as polypropylene capacitors. The high frequency part of the stray current may involve high voltage pulses which require a capacitor with a high rate of voltage change dV/dt capability as well as a high operational voltage value.

In another aspect of the invention, the capacitance value of said at least one capacitor is in the range of 100 and 1000 microfarad.

In further aspect of the invention, said at least one capacitor are a plurality of capacitors in a serial and/or parallel connection. By using plurality of capacitors in serial and/or parallel connections it is possibly in a cost efficient manner to obtain desired values such as high capacitance and/or a high operational voltage value.

In an even further aspect of the invention, capacitance value of said at least one capacitor is very different from at least one internal capacitance of the electric generator such as at least 10 times the value of the capacitance at the bearings. Hereby it is ensured that the capacitor is the desired path for a high frequency stray current instead of the internal generator capacitors.

In an aspect of the invention, said connections to the drive end and the non drive end are established by rotating electrical connectors. The rotating electrical connectors may be any type of electrical connection to rotating equipment e.g. slip rings with carbon or copper brushes e.g. carbon/silver brushes.

In aspects of the invention, the rotating electrical connector at the drive or non drive end of the generator shaft are slip rings each comprising a plurality of connections e.g. by using between two and four brushes such as three preferably positioned symmetrically around the generator shaft. Hereby it is possible to establish a rotating electric connection with a very low resistance and especially three brushes is advantageous in relation to resistance, durability, size and costs.

It shall be emphasised that the brushes may be replaced with any other type of electric rotating connection such as a ball bearing configuration comprising electric conducting bearing grease.

In an aspect of the invention, the electric generator is connected to other wind turbine components by the shaft and an electrically isolated shaft connection e.g. a composite connection with glass fiber separated flanges. Hereby it is ensured that the generator and the other wind turbine components are electrically disconnected via the shaft.

In another aspect of the invention, said electric generator is a double fed induction generator with a wound rotor connected to a frequency converter. Especially the close electric relationship between the rotor bearings and the rotor connected frequency converter makes the use of the protection system advantageous e.g. in relation to voltage spikes and common mode noise of a generator in a modern variable speed wind turbine.

In further aspects of the invention, said electric generator is an induction or a synchronous generator with a stator connected to a frequency converter.

In another aspect of the invention, said at least one current path is a short circuit connection to the ground potential. Hereby it is possible to direct DC current to the ground potential without flowing through any generator bearings.

The term "direct current path" should be understood as a connection intended to have a very low resistance and reactance in connecting the non drive end of the generator shaft to the ground potential.

The invention further relates to a wind turbine supplying electric power to a utility grid comprising at least one electric generator, at least one frequency converter connected to said electric generator and utility grid, and at least one protection system for the electric generator. Hereby it is possible to control any stray current noise from following undesired paths in a wind turbine e.g. protecting the generator and gearbox bearings. Further, the electromagnetic compatibility EMC of the wind turbine is ensured as high frequency noise cannot use the shaft as an antenna.

The invention also relates to a use of the protection system in a wind turbine as a filter for electric noise. Hereby it is possible to control any stray current noise from following undesired paths in a wind turbine e.g. protecting the shaft of the electric generator from different currents.

BRIEF DESCRIPTION OF THE DRAWINGS

The invention will be described in the following with reference to the figures in which.

DETAILED DESCRIPTION OF THE INVENTION

Figure 1:
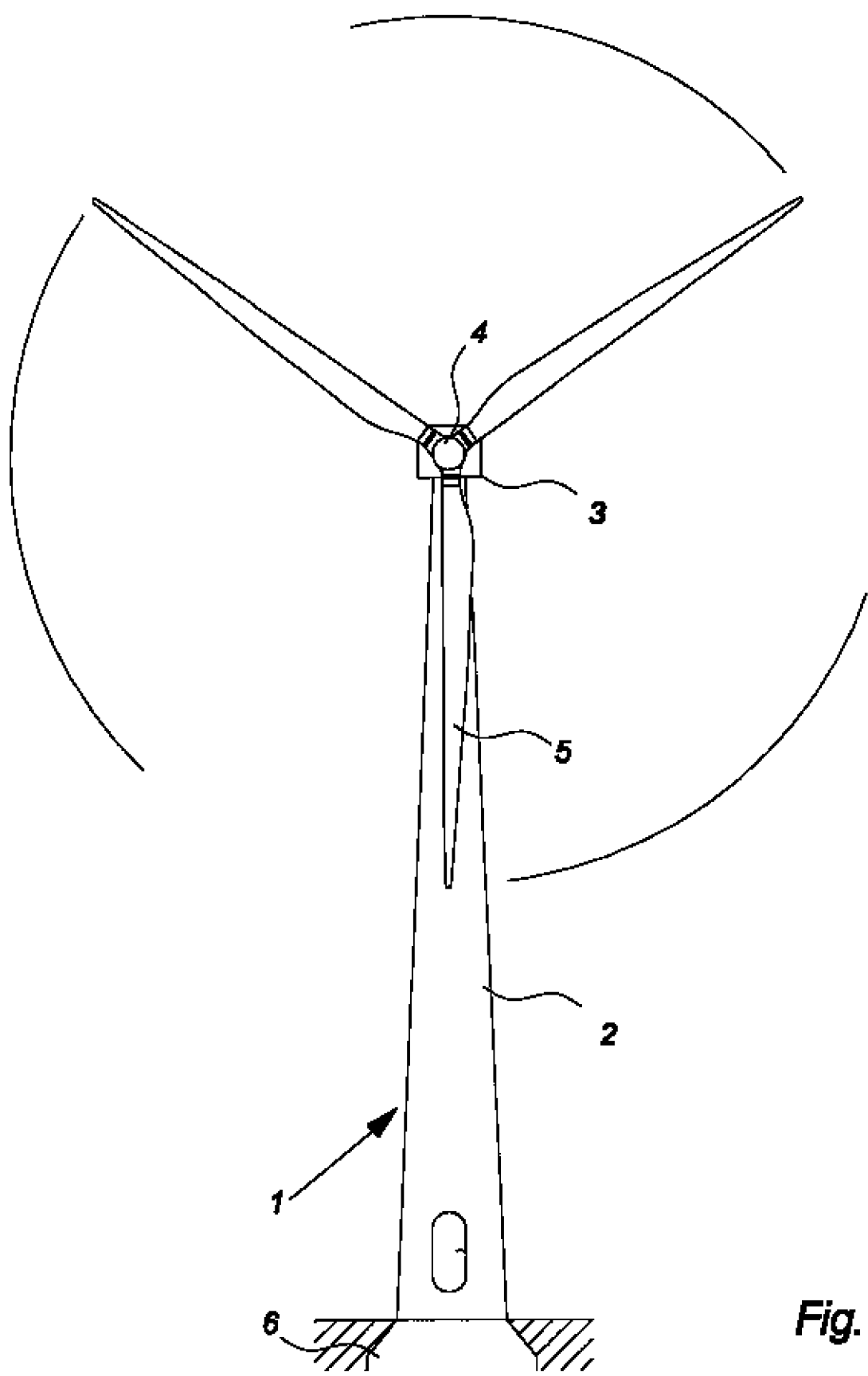
FIG. 1 illustrates a large modern wind turbine.

FIG. 1 illustrates a modern wind turbine 1. The wind turbine 1 comprises a tower 2 positioned on a foundation 6. A wind turbine nacelle 3 with a yaw mechanism is placed on top of the tower 2.

The wind turbine rotor comprises at least one rotor blade e.g. three rotor blades 5 as illustrated on the figure. The rotor blades 5 may be pitchable in relation to the hub 4 by using pitch mechanisms or fixed mounted to the hub 4 as stall rotor blades.

Figure 2:
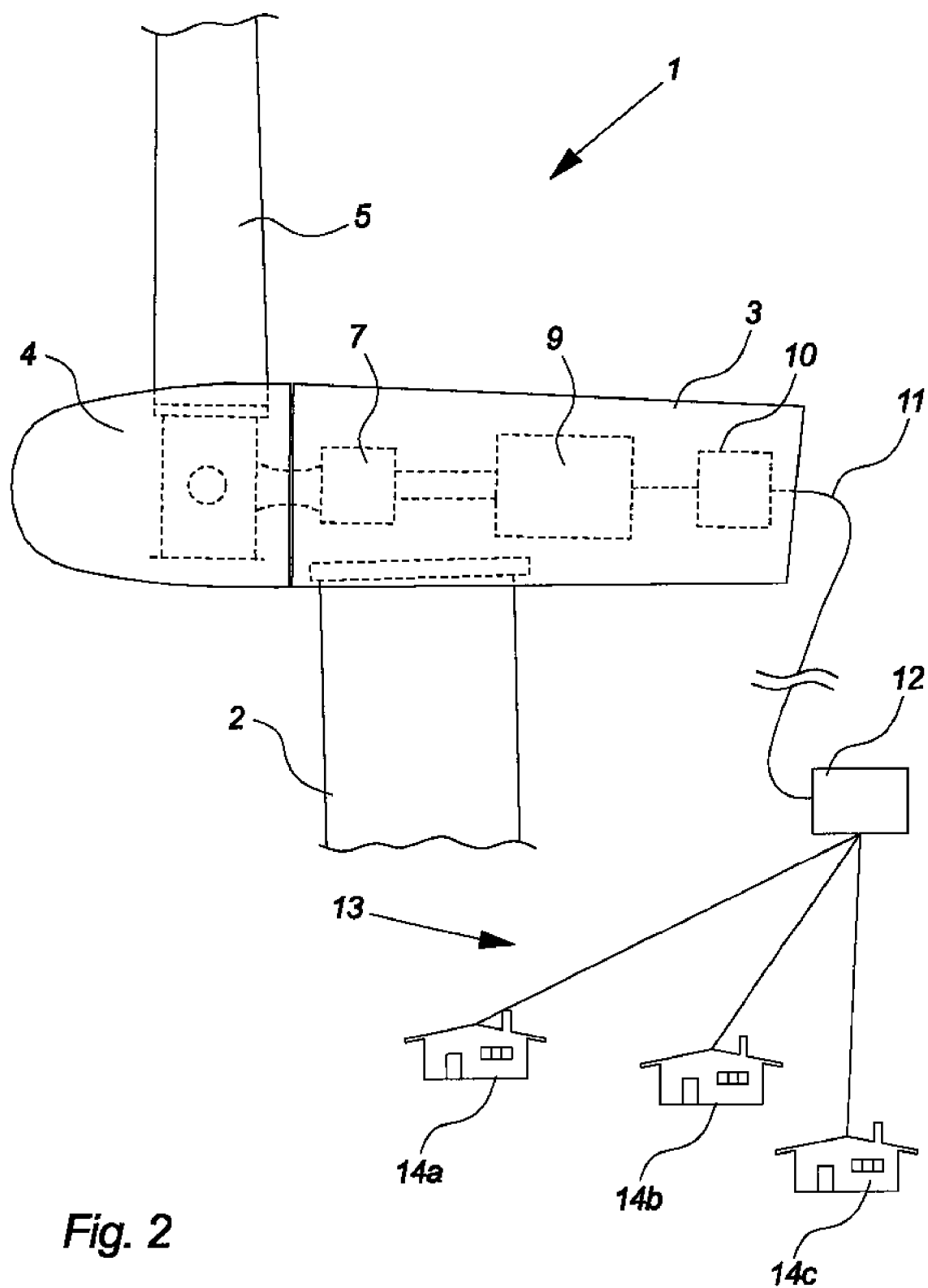
FIG. 2 illustrates the wind turbine of FIG. 1 electrically connected to a utility grid.

FIG. 2 illustrates main components of a modern wind turbine and especially the main components of the nacelle 3 as well as the electric components in utility grid connecting the wind turbine.

The wind turbine is illustrated with a gearbox 7 connected to the rotor blades 5 through the hub 4 as well as to the electric generator 9 through a shaft. The electric generator transforms the rotation of the shaft to alternating electricity which partly or totally is converted by a frequency converter 10 before being transmitted to a utility grid 13 and electricity consumers 14*a-c* of the utility grid.

Figure 3:
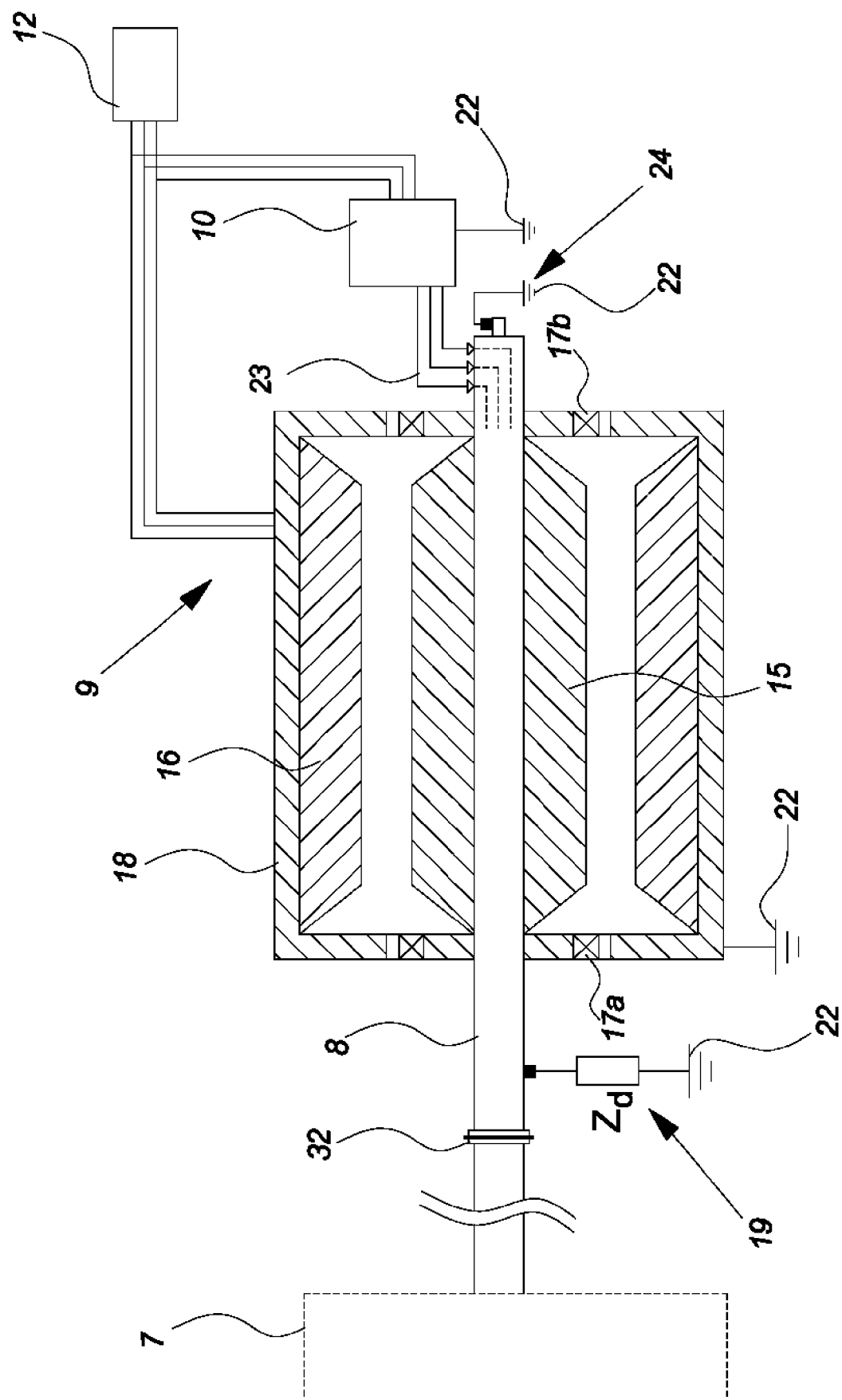
FIG. 3 illustrates an electric generator of a wind turbine with a protection system according to the invention.

FIG. 3 illustrates an electric generator 9 of a wind turbine with a protection system according to the invention.

The figure illustrates that the electric generator 9 comprises a shaft 8 where the shaft extends with a drive end out toward the gearbox 7 and with a non drive end out toward the frequency converter 10. The shaft 8 rotates in bearings 17*a*, 17*b* in the drive and non drive end of the generator housing 18 and hereby allowing the rotor windings to rotate in relation to the stator windings.

The frequency converter 10 is connected to the rotor windings through the shaft 8 with a slip ring connection 23 whereby the generated electricity of the rotor 15 may be transferred to the frequency converter. The frequency converter converts the generated variable frequency electricity to fixed frequency electricity for the utility grid with operating a number of electric switches.

The frequency converter 10 may also be a full scale converter converting the generated electricity of the stator 16 and rotor 15 to the utility grid 13.

The switching operations will generate different types of electric noise e.g. low and high frequency noise. Further, the noise may be transferred as stray currents to the different main components of the wind turbine such as the stationary and rotating parts of the generator and gearbox. The stray currents may for example follow a current path from the rotating parts of the generator to the stationary part of the generator through the bearings 17*a*, 17*b*.

The generator shaft 8 is illustrated with a protection system comprising a direct connection circuit 24 of the non drive end through a slip ring connection to a ground potential. The direct connection 24 ensures that any stray currents at the non drive end are grounded.

The protection system further comprises a separate impedance circuit 19 with an impedance value $Z_d$ connected to a ground potential. The separate impedance circuit 19 is also connected to the drive end of the shaft 8 through a slip ring connection. The impedance ensures a ground path for high frequency stray currents and avoids any DC stray current path at the drive end of the shaft.

The protection system especially ensures that stray currents are not circling through the bearings 17*a*, 17*b* or use the shaft as an antenna radiating electromagnetic interference.

Figure 4:
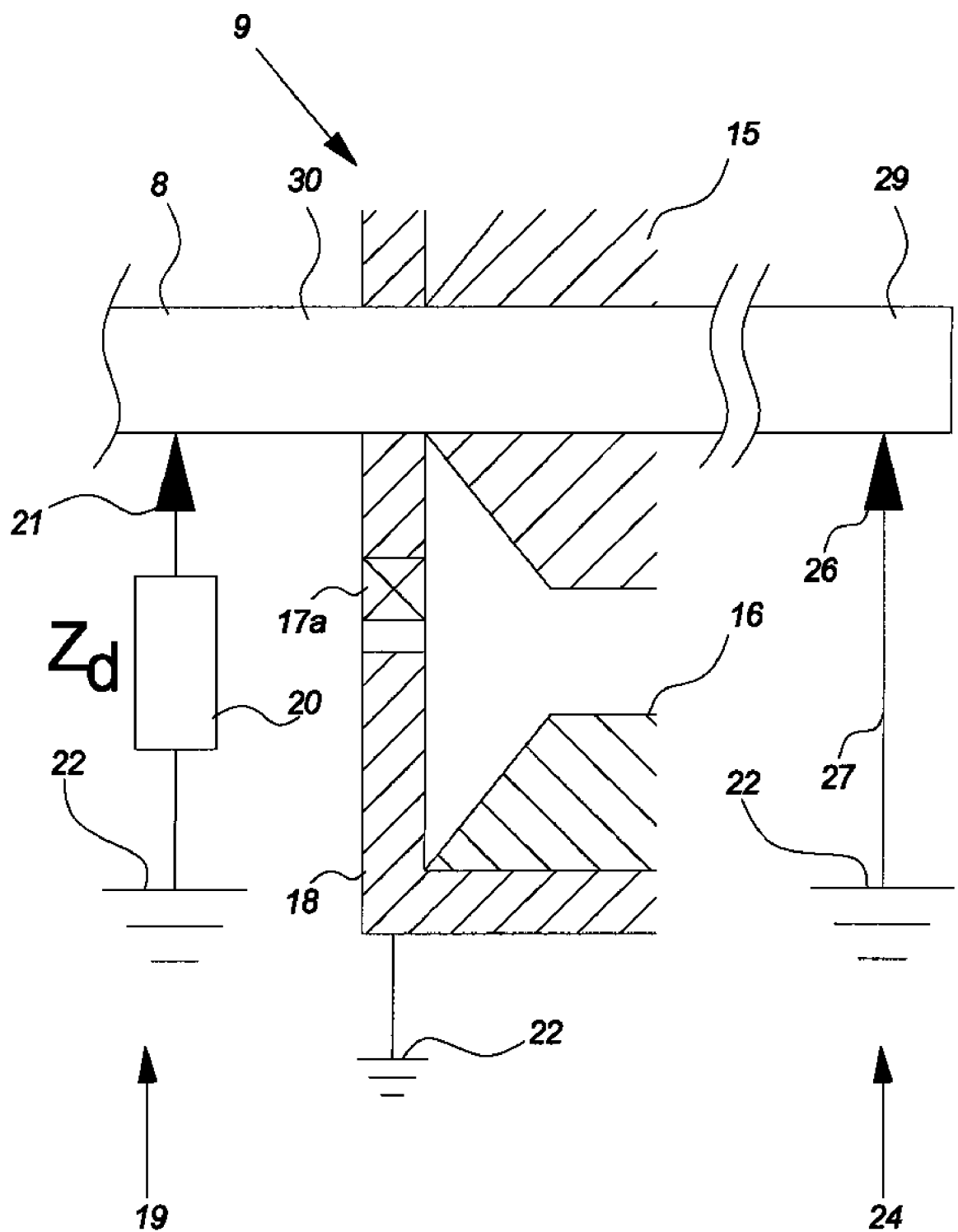
FIG. 4 illustrates an enlarged view of parts of the electric generator with the protection system according to the invention.

FIG. 4 illustrates an enlarged view of a part of the electric generator 9 with a protection system according to the invention.

The impedance circuit is illustrated with the separate impedance 20 connected to the slip ring connection 21 or similar rotating electrical connectors as well as the ground potential 22. The slip ring connection 21 allows a sliding electric contact to the shaft 8 at the drive end.

The direct connection circuit is illustrated with a direct connection 27 between the slip ring connection 26 or similar rotating electrical connectors and a ground potential 22. The slip ring connection 26 allows a sliding electric contact to the shaft 8 at the non drive end.

Figure 5:
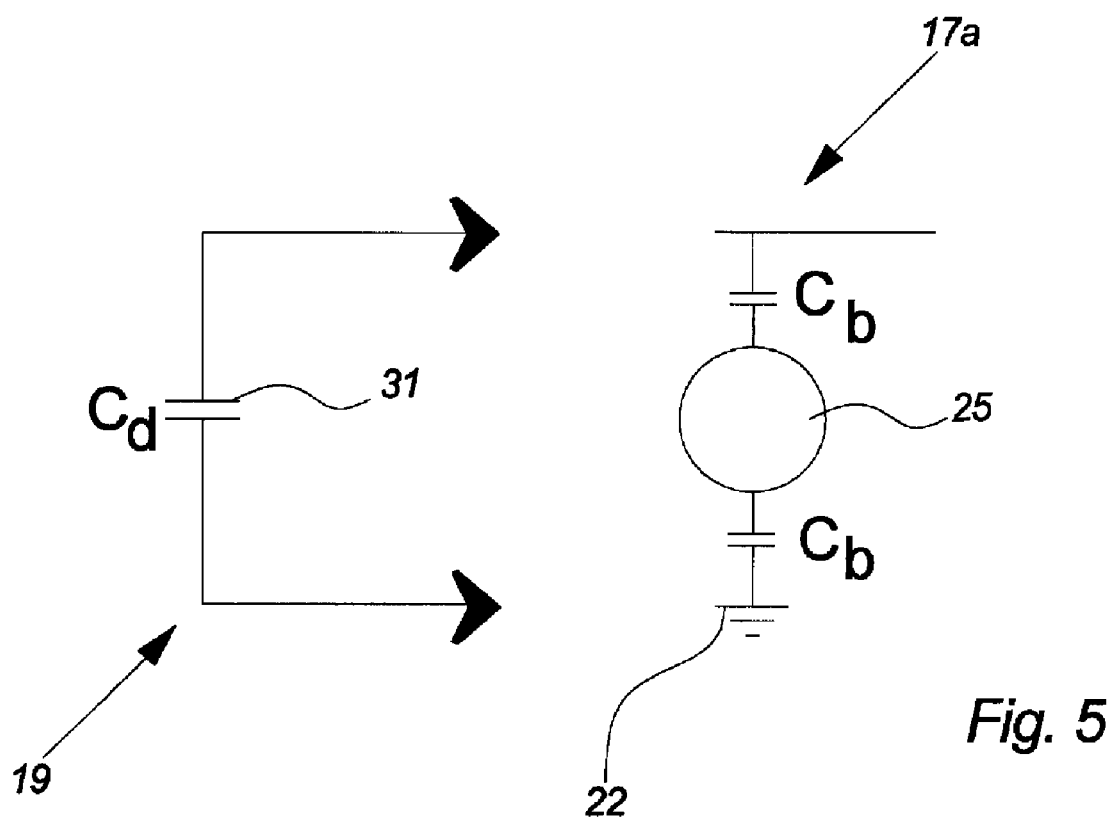
FIG. 5 illustrates schematically a part of the electric generator with an impedance circuit of the protection system according to the invention.

FIG. 5 illustrates schematically a part of the electric generator with an impedance circuit of the protection system according to the invention.

The impedance circuit 19 is illustrated as one capacitor with a capacitance value $C_d$.

The drive end bearing 17*a* of the electric generator is illustrated with a bearing ball 25 and with stray capacitors $C_b$ to the raceways of the bearing. The stray capacitors $C_b$ are established by the oil or grease film separating the raceways from the bearing ball. One stray capacitor/raceway is connected to a ground potential through the housing 18 of the generator and the other stray capacitor/raceway is connected to the shaft 8. Further stray capacitances may for example be established between the bearing and the adjacent parts of the stator housing.

The capacitor $C_d$ is connected in parallel with the serial connected stray capacitors.

The reactance of a capacitor is given by $$X_C = -\frac{1}{2\pi fC} = -\frac{1}{\omega C}$$

where
ω=2πf, the angular frequency
f=frequency
C=capacitance.

The capacitance of the capacitor $C_d$ is much larger than the sum of the stray capacitance $C_b$. Consequently the reactance of the stray capacitors $C_b$ is significantly larger than the reactance of the capacitor $C_d$. Almost all of a low or high frequency stray current will thus choose the capacitor $C_d$ as the current path.

Generally, the reactance is inversely proportional to the frequency. That is, for very high-frequency alternating currents the reactance approaches zero so that a capacitor is nearly a short circuit to a very high frequency AC source.

Conversely, for very low frequency alternating currents, the reactance increases without bound so that a capacitor is an open circuit to a DC source.

Further, a low frequency alternating current such as a current with the nominal grid frequency or lower harmonics of the grid frequency will face a significant reactance in the capacitor e.g. harmonics due to different loads on the phase windings of the generator. Consequently, much of the energy in lower frequencies currents will be converted to heat in the capacitor i.e. the low frequency current values will suppressed by the capacitor.

The capacitor $C_d$ is preferably capacitor with a high rate of voltage change dV/dt capability as the stray currents often involves significant voltage pulses.

The instantaneous current in a capacitor is often expressed by the rate of voltage change, or dV/dt. The change is related according to the formula I=C*dV/dt, or dV/dt=I/C.

The voltage changes may often be substantially square waved e.g. with a voltage change rate of more than 500 volt/μsec e.g. 700 or 800 V/μsec.

Figure 6:
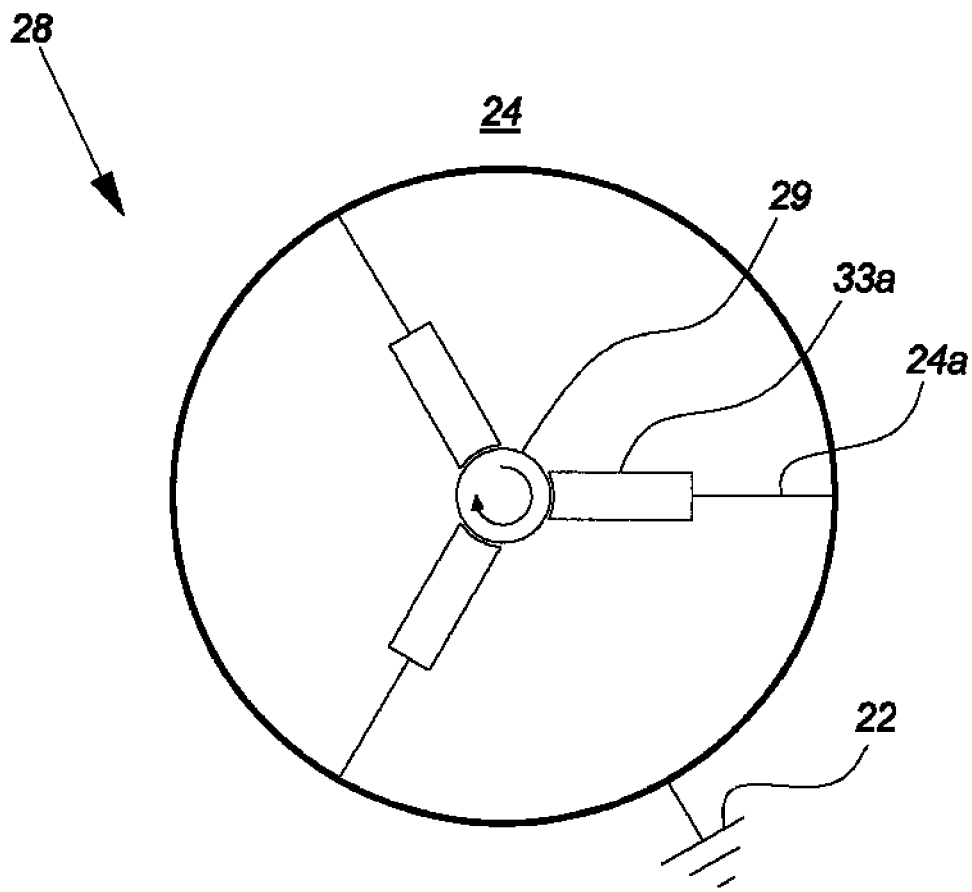
FIG. 6 illustrates schematically a preferred embodiment of the protection system according to the invention.
Figure 6:
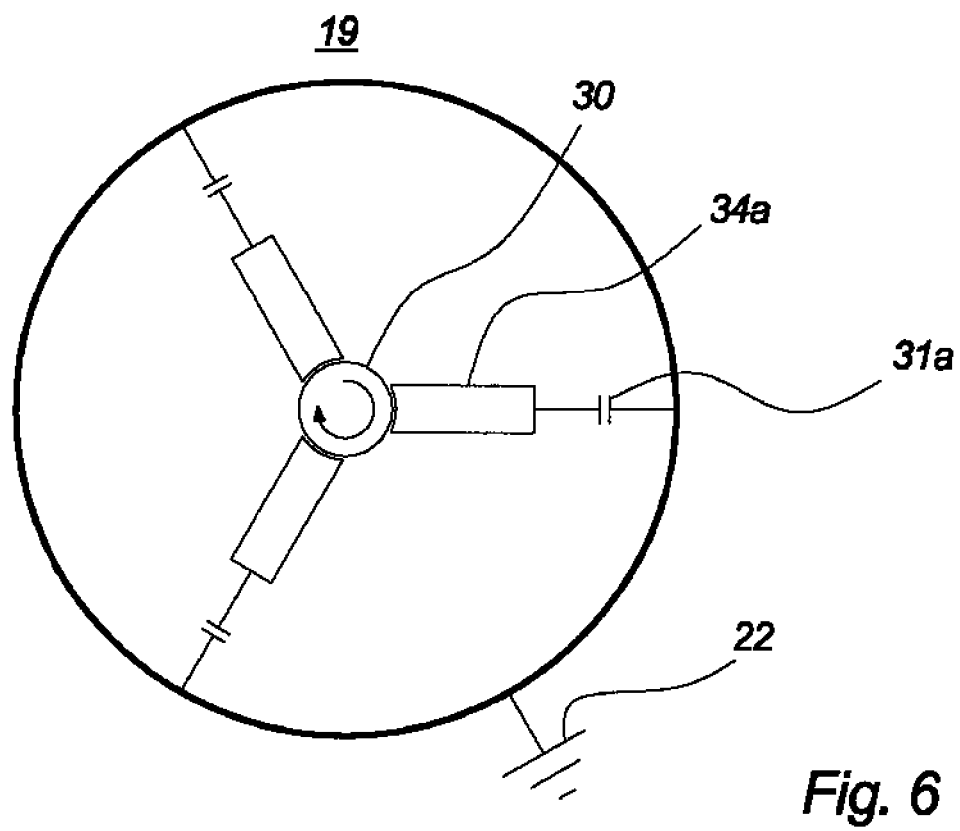

FIG. 6 illustrates schematically a preferred embodiment of the protection system according to the invention.

The two figures illustrate the drive 30 and non drive end 29 of the generator shaft 8 with the protection system 28 installed.

The first figure shows three stationary brushes 33a forced against the rotating non drive end 29 of the generator shaft 8 e.g. the brushes sliding against a slip ring on the shaft end. The brushes are symmetrically positioned around the shaft i.e. substantially 120 degrees apart. Each brush is directly connected to the ground potential 22 e.g. a connection to a common circuit for the non drive end brushes wherein the circuit is connected to the ground potential.

The second figure shows three stationary brushes 34a forced against the rotating drive end 30 of the generator shaft 8 e.g. the brushes sliding against a slip ring on the shaft end. The brushes are symmetrically positioned around the shaft i.e. substantially 120 degrees apart. Each brush is connected to the ground potential through one capacitor 31a or a number of parallel and/or serial connected capacitors.

Altogether FIG. 6 (with reference to FIG. 3) illustrates the protection system 28 in relation to the electric generator of a wind turbine. The current path which is established with the direct connection at the non drive end of the generator shaft ensures that any DC current is directly sent to the ground potential. The alternating current path which is established with the capacitors at the drive end of the generator shaft ensures that any high frequency current is directly sent to the ground potential and any low frequency current is suppressed with the reactance of the capacitors.

The invention has been exemplified above with reference to specific examples of impedances in a protection system in an electric generator. However, it should be understood that the invention is not limited to the particular impedance example described above but may be altered e.g. by using several impedances in parallel or serial connection such as 3 capacitors in a parallel connection or 3 capacitors in a serial connection. Further, it should be understood that the use of capacitors may be replaced by coil/capacitor configurations e.g. in order to establish a band pass filter instead of high pass filter solution at the drive end.

Even further, the protection system may be designed in a multitude of varieties within the scope of the invention as specified in the claims.

REFERENCE LIST

In the drawings the following reference numbers refer to:
1. Wind turbine
2. Wind turbine tower
3. Wind turbine nacelle
4. Wind turbine rotor hub
5. Wind turbine rotor blade
6. Wind turbine foundation
7. Gearbox
8. Generator shaft such as the high speed shaft connecting the gearbox and electric generator
9. Electric generator
10. Frequency converter
11. Connection from the wind turbine to a utility grid connection point
12. Utility grid transformer
13. Utility grid
14a-c. Electricity consumers
15. Rotor winding of the electric generator
16. Stator winding of the electric generator
17a. Drive end bearing of the electric generator
17b. Non drive end bearing of the electric generator
18. Housing of the electric generator
19. Alternating current path part of the protection system for the electric generator
20. Alternating current path e.g. an impedance of the protection system
21. Connection to the drive end of the generator shaft e.g. a slip ring connection
22. Ground potential for the protection system
23. Slip ring connection between the electric generator and frequency converter
24. Current path part e.g. a direct connection grounding the generator shaft at the non drive end
25. Bearing rolling element such as a bearing ball
26. Connection to the non drive end of the generator shaft e.g. a slip ring connection
27. Direct connection as a short circuit of the non drive end of the generator shaft
28. Protection system comprising the parts with a current path 24 and an alternating current path 19
29. Non drive end of the generator shaft
30. Drive end of the generator shaft
31. At least one capacitor e.g. with high dV/dt capability
32. Shaft connection e.g. comprising two glass fiber separated flanges
33. Brush—non drive end of the generator shaft
34. Brush—drive end of the generator shaft C. Capacitor
$C_b$. Capacitances of a generator bearing
$C_d$. Capacitor of the protection system
I. Current
$Z_d$. Impedance in the protection system

What is claimed is:

1. Protection system for an electric generator of a wind turbine comprising
    at least one current path from a non drive end of a generator shaft to a ground potential, and
    at least one alternating current path from a drive end of the generator shaft to the ground potential;
    wherein said alternating current path comprises an impedance circuit comprising at least one capacitor;
    wherein said electric generator comprises a drive end bearing and a non drive end bearing; and
    wherein a capacitance value of said at least one capacitor is different from at least one internal capacitance of the electric generator.

2. Protection system according to claim 1 wherein said at least one capacitor is a type of capacitor with a high rate of voltage change dV/dt capability of at least 500 volt/μsec.

3. Protection system according to claim 1 wherein the capacitance value of said at least one capacitor is in the range of 100 and 1000 microfarad.

4. Protection system according to claim 1 wherein said at least one capacitor are a plurality of capacitors in a serial and/or parallel connection.

5. Protection system according to claim 1 wherein the electric generator is connected to other wind turbine components by the shaft and an electrically isolated shaft connection.

6. Protection system according to claim 5 wherein the electrically isolated shaft connection is a composite connection with glass fiber separated flanges.

7. Protection system according to claim 1 wherein said electric generator is a double fed induction generator with a wound rotor connected to a fre- quency converter.

8. Protection system according to claim 1 wherein said electric generator is an induction generator with a stator connected to a frequency converter.

9. Protection system according to claim 1 wherein said electric generator is a synchronous generator with a stator connected to a frequency converter.

10. Protection system according to claim 1 wherein said at least one current path is a short circuit connection to the ground potential.

11. Use of a protection system according to claim 1 in a wind turbine as a filter for electric noise.

12. Protection system according to claim 1 wherein the capacitance value is at least 10 times the value of the capacitance at the bearings.

13. Protection system for an electric generator of a wind turbine comprising
    at least one current path from a non drive end of a generator shaft to a ground potential, and
    at least one alternating current path from a drive end of the generator shaft to the ground potential;
    wherein said alternating current path comprises an impedance circuit comprising at least one capacitor;
    wherein said electric generator comprises a drive end bearing and a non drive end bearing;
    wherein the at least one current path from the drive end and the at least one current path from the non drive end of the generator shaft are established by rotating electrical connectors; and
    wherein the rotating electrical connector at the non drive end of the generator shaft is a slip ring comprising a plurality of connections positioned symmetrically around the generator shaft.

14. Protection system for an electric generator of a wind turbine comprising
    at least one current path from a non drive end of a generator shaft to a ground potential, and
    at least one alternating current path from a drive end of the generator shaft to the ground potential;
    wherein said alternating current path comprises an impedance circuit comprising at least one capacitor;
    wherein said electric generator comprises a drive end bearing and a non drive end bearing;
    wherein the at least one current path from the drive end and the at least one current path from the non drive end of the generator shaft are established by rotating electrical connectors; and
    wherein the rotating electrical connector at the drive end of the generator shaft is a slip ring comprising a plurality of connections positioned symmetrically around the generator shaft.

15. Wind turbine supplying electric power to a utility grid comprising
    at least one electric generator,
    at least one frequency converter connected to said electric generator and the utility grid, and
    at least one protection system for the electric generator having at least one current path from a non drive end of a generator shaft to a ground potential, and
    at least one alternating current path from a drive end of the generator shaft to the ground potential;
    wherein said alternating current path comprises an impedance circuit comprising at least one capacitor; and
    wherein a capacitance value of said at least one capacitor is different from at least one internal capacitance of the electric generator.

* * * * *

UNITED STATES PATENT AND TRADEMARK OFFICE
CERTIFICATE OF CORRECTION

PATENT NO.         : 7,830,031 B2                                         Page 1 of 1
APPLICATION NO.    : 12/211446
DATED              : November 9, 2010
INVENTOR(S)        : Lars Helle et al.

It is certified that error appears in the above-identified patent and that said Letters Patent is hereby corrected as shown below:

ON THE TITLE PAGE:

Item (75) Inventors: should read:   Jari Ottesen, Arhus C (DK)

Signed and Sealed this
Eighth Day of February, 2011

David J. Kappos
*Director of the United States Patent and Trademark Office*